(12) United States Patent
Somiya et al.

(10) Patent No.: US 12,434,693 B2
(45) Date of Patent: Oct. 7, 2025

(54) VEHICLE CONTROL APPARATUS

(71) Applicant: TOYOTA JIDOSHA KABUSHIKI KAISHA, Toyota (JP)

(72) Inventors: Tomoki Somiya, Okazaki (JP); Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 18/343,142

(22) Filed: Jun. 28, 2023

(65) Prior Publication Data

US 2024/0116498 A1  Apr. 11, 2024

(30) Foreign Application Priority Data

Oct. 5, 2022  (JP) ................ 2022-160850

(51) Int. Cl.
*B60W 30/09* (2012.01)

(52) U.S. Cl.
CPC ....... *B60W 30/09* (2013.01); *B60W 2540/103* (2013.01); *B60W 2554/4041* (2020.02); *B60W 2554/4048* (2020.02); *B60W 2720/106* (2013.01)

(58) Field of Classification Search
CPC ........... B60W 50/12; B60W 2540/103; B60W 2554/4048; B60W 2720/106
USPC .......................................................... 701/93
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 2008/0004807 A1* | 1/2008 | Kimura ................ | B60W 50/16 701/301 |
| 2013/0261915 A1* | 10/2013 | Tokimasa ............. | B60W 10/18 701/70 |
| 2016/0075313 A1* | 3/2016 | Moriizumi ............ | B60T 7/22 701/93 |
| 2017/0291602 A1* | 10/2017 | Newman ............... | B60W 10/04 |
| 2018/0208195 A1* | 7/2018 | Hutcheson ........... | B60W 50/14 |
| 2019/0315345 A1* | 10/2019 | Newman ............... | B60W 50/14 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |

(Continued)

FOREIGN PATENT DOCUMENTS

| | | |
|---|---|---|
| JP | 2017-033403 A | 2/2017 |
| JP | 2018-5808 A | 1/2018 |
| JP | 2019-139281 A | 8/2019 |

*Primary Examiner* — Anshul Sood
(74) *Attorney, Agent, or Firm* — Sughrue Mion, PLLC

(57) ABSTRACT

A vehicle control apparatus executes an acceleration suppression control to suppress an acceleration of an own vehicle when an operating condition including a condition that an accelerator pedal operation amount is equal to or greater than a predetermined threshold value is satisfied. The vehicle control apparatus sets the predetermined threshold value to a smaller value when an object entry condition that an object has a possibility to enter an area in front of the own vehicle, is satisfied than when the object entry condition is not satisfied.

8 Claims, 5 Drawing Sheets

(56) References Cited

U.S. PATENT DOCUMENTS

| | | | |
|---|---|---|---|
| 2021/0237720 A1* | 8/2021 | Chen | B60W 40/105 |
| 2022/0388505 A1* | 12/2022 | Sharma Banjade | ........................ |
| | | | G08G 1/096783 |
| 2023/0146809 A1* | 5/2023 | Johansson | B60W 30/146 |
| | | | 701/70 |

* cited by examiner

VEHICLE CONTROL APPARATUS

CROSS-REFERENCE TO RELATED APPLICATIONS

This application claims priority to Japanese patent application No. JP 2022-160850 filed on Oct. 5, 2022, the content of which is hereby incorporated by reference in its entirety.

BACKGROUND

Field

The present invention relates to a vehicle control apparatus.

Description of the Related Art

There is known a vehicle control apparatus which executes a collision avoidance control to avoid collision between an own vehicle and an object such as another vehicle or a pedestrian by autonomously braking or steering the own vehicle when there is a possibility that an own vehicle collides with an object such as another vehicle or a pedestrian (see, for example, JP 2017-33403 A).

There is also known a vehicle control apparatus which executes an acceleration suppression control to prevent the own vehicle from being accelerated suddenly when an accelerator pedal is accidentally operated to a great extent. The own vehicle can be prevented from colliding with the object by setting a condition that the object enters an area in front of the own vehicle as the condition for executing the acceleration suppressing control. If the condition for executing the acceleration suppression control is set to a condition that is more likely to be satisfied, the own vehicle can be reliably prevented from colliding with the object. However, if the condition for executing the acceleration suppression control is likely to be satisfied to an excessive extent, the acceleration suppression control is executed in a situation where an execution of the acceleration suppression control is unnecessary.

SUMMARY

An object of the present invention is to provide a vehicle control apparatus which can reliably prevent the own vehicle from colliding with the object while suppressing unnecessary execution of the acceleration suppression control.

According to the present invention, a vehicle control apparatus comprises an electronic control unit configured to execute an acceleration suppression control to suppress an acceleration of an own vehicle when an operating condition including a condition that an accelerator pedal operation amount is equal to or greater than a predetermined threshold value is satisfied. The electronic control unit is configured to set the predetermined threshold value to a smaller value when an object entry condition that an object has a possibility to enter an area in front of the own vehicle, is satisfied than when the object entry condition is not satisfied.

With the vehicle control apparatus according to the invention, it is determined whether or not the acceleration suppression control needs to be executed, based on whether or not the object has the probability to enter the area in front of the own vehicle. Therefore, the own vehicle can be reliably prevented from colliding with the object while the unnecessary acceleration suppression control is suppressed from being executed.

According to an aspect of the present invention, the object entry condition may be a condition that a blind spot area exists in front of the own vehicle, the object exists in the blind spot area, and the object has the possibility to enter the area in front of the own vehicle.

With the vehicle control apparatus according to this aspect of the present invention, it is determined whether or not the acceleration suppression control needs to be executed, based on whether or not the object existing in the blind spot area has the probability to enter the area in front of the own vehicle. Therefore, the own vehicle can be reliably prevented from colliding with the object while the unnecessary acceleration suppression control is suppressed from being executed.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
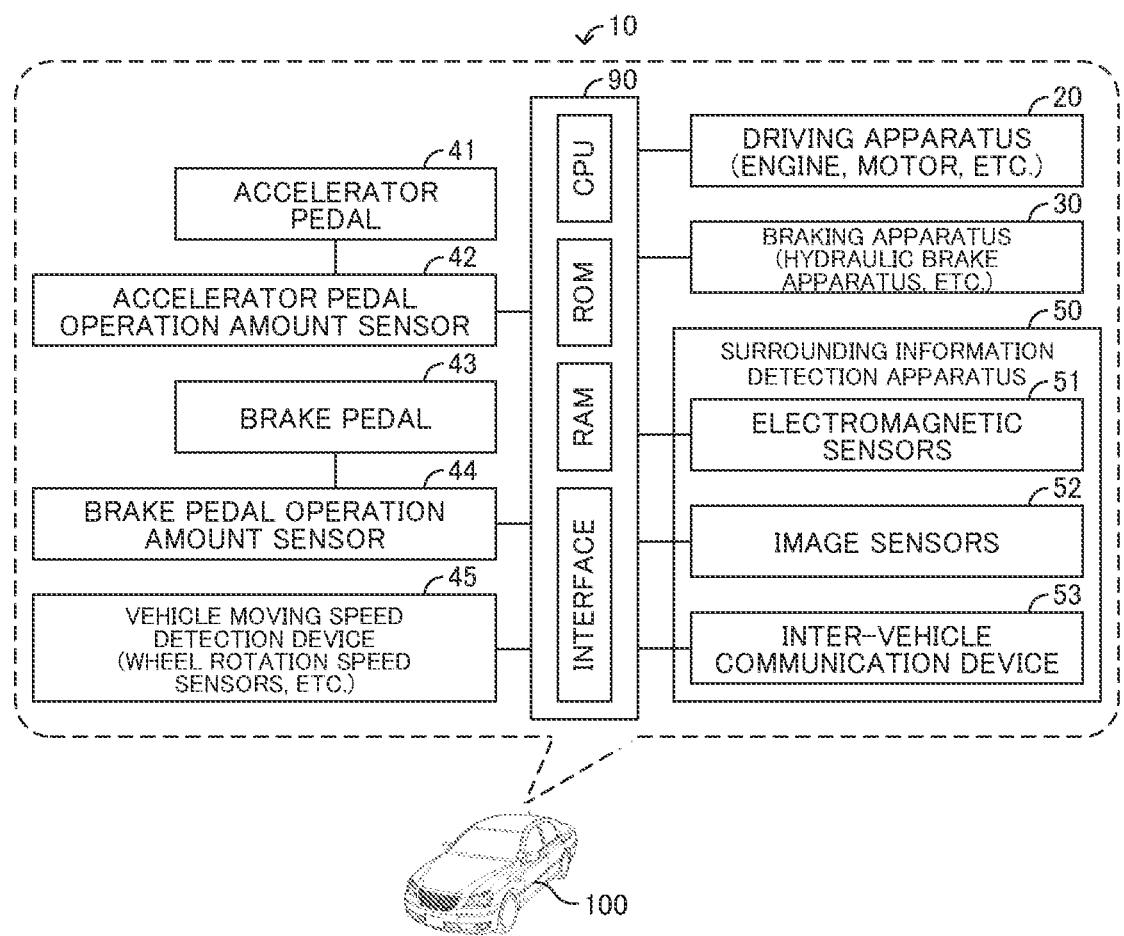
FIG. 1 is a view showing a vehicle control apparatus according to an embodiment of the present invention.

Below, a vehicle control apparatus according to an embodiment of the present invention will be described with reference to the drawings. Hereinafter, the vehicle control apparatus 10 will be described by exemplifying that an operator of own vehicle 100 is a person who is in an own vehicle 100 and drives the own vehicle 100, that is, a driver of the own vehicle 100. Therefore, in the present embodiment, the vehicle control apparatus 10 is mounted on the own vehicle 100 as shown in FIG. 1.

However, the operator of own vehicle 100 may be an operator who is not in the own vehicle 100 but who remotely operates the own vehicle 100, that is, a remote operator of own vehicle 100. When the operator of own vehicle 100 is the remote operator, the vehicle control apparatus 10 is mounted on the own vehicle 100 and a remote operation facility installed outside the own vehicle 100 for remotely driving the own vehicle 100, and functions of the vehicle control apparatus 10 described below are realized by the vehicle control apparatus 10 mounted on the own vehicle 100 and the vehicle control apparatus 10 mounted on the remote operation facility.

The vehicle control apparatus 10 includes an ECU 90 as a control device and executes an acceleration suppression control described later as an automatic driving control for the own vehicle 100.

The ECU 90 is an electronic control unit The ECU 90 includes a microcomputer as a main component. The microcomputer includes a CPU, a ROM, a RAM, a non-volatile memory, and an interface. The CPU implements various functions by executing instructions, programs, or routines stored in the ROM. In the present embodiment, the vehicle control apparatus 10 includes one ECU, but as will be described later, the vehicle control apparatus 10 may include a plurality of the ECUs and execute various processes described later by the ECUs.

As shown in FIG. 1, the own vehicle 100 is equipped with a driving apparatus 20, a braking apparatus 30, and a displaying device 40.

The driving apparatus 20 is an apparatus which outputs a driving force applied to the own vehicle 100, and includes, for example, an internal combustion engine and/or at least one electric motor. The driving apparatus 20 is electrically connected to the ECU 90. The ECU 90 can control the driving force outputted from the driving apparatus 20.

The braking apparatus 30 is an apparatus which applies a braking force to the own vehicle 100, and is, for example, a hydraulic brake apparatus. The braking apparatus 30 is electrically connected to the ECU 90. The ECU 90 can control the braking force applied to the own vehicle 100 by the braking apparatus 30.

Further, the own vehicle 100 is equipped with an accelerator pedal 41, an accelerator pedal operation amount sensor 42, a brake pedal 43, a brake pedal operation amount sensor 44, a vehicle moving speed detection device 45, and a surrounding information detection apparatus 50.

The accelerator pedal 41 is a device operated by a driver of the own vehicle 100 to accelerate the own vehicle 100. The accelerator pedal operation amount sensor 42 is a device which detects an operation amount of the accelerator pedal 41. When the operator of the own vehicle 100 is the remote operator of the own vehicle 100, the accelerator pedal 41 and the accelerator pedal operation amount sensor 42 are mounted on the remote operation facility.

The accelerator pedal operation amount sensor 42 is electrically connected to the ECU 90. The ECU 90 acquires the operation amount of the accelerator pedal 41 as an accelerator pedal operation amount AP by the accelerator pedal operation amount sensor 42. The ECU 90 calculates and acquires an acceleration of the own vehicle 100 requested by the driver as a driver-requested acceleration Ga_driver, based on the accelerator pedal operation amount AP. When the driver-requested acceleration Ga_driver is greater than zero, the ECU 90 executes a normal travel control to control the driving force outputted from the driving apparatus 20 so that the driver-requested acceleration Ga_driver is achieved, except when the ECU 90 executes the acceleration suppression control described later.

The brake pedal 43 is a device operated by the driver to decelerate the own vehicle 100. The brake pedal operation amount sensor 44 is a device which detects an operation amount of the brake pedal 43. When the operator of the own vehicle 100 is the remote operator of the own vehicle 100, the brake pedal 43 and the brake pedal operation amount sensor 44 are mounted on the remote operation facility.

The brake pedal operation amount sensor 44 is electrically connected to the ECU 90. The ECU 90 acquires the operation amount of the brake pedal 43 as a brake pedal operation amount BP by the brake pedal operation amount sensor 44. The ECU 90 calculates and acquires a deceleration of the own vehicle 100 requested by the driver as a driver-requested deceleration Gd_driver, based on the brake pedal operation amount BP. When the driver-requested deceleration Gd_driver is greater than zero, the ECU 90 executes the normal travel control to control the braking force applied from the braking apparatus 30 to the own vehicle 100 so that the driver-requested deceleration Gd_driver is achieved, except when the ECU 90 executes the acceleration suppression control described later.

The vehicle moving speed detection device 45 is a device which detects a moving speed of the own vehicle 100, and includes, for example, wheel rotation speed sensors provided on respective wheels of the own vehicle 100. The vehicle moving speed detection device 45 is electrically connected to the ECU 90. The ECU 90 acquires the moving speed of the own vehicle 100 as an own vehicle moving speed V by the vehicle moving speed detection device 45.

The surrounding information detection apparatus 50 is an apparatus which acquires information on a situation around the own vehicle 100, and in the present embodiment, includes electromagnetic wave sensors 51, image sensors 52, and an inter-vehicle communication device 53.

The electromagnetic wave sensor 51 is a sensor which acquires data or object data on an object around the own vehicle 100, and is, for example, a radio wave sensor such as a radar sensor such as a millimeter wave radar, a sound wave sensor such as an ultrasonic sensor such as a clearance sonar, and an optical sensor such as a laser radar such as a LiDAR. The electromagnetic wave sensor 51 transmits electromagnetic waves and receives the electromagnetic waves or reflected waves reflected by the objects. The object data is information on the transmitted electromagnetic waves and the reflected waves. The electromagnetic wave sensors 51 are electrically connected to the ECU 90. The ECU 90 acquires the object data from the electromagnetic wave sensors 51 as surrounding detection information IS.

The ECU 90 detects the objects in front of own vehicle 100, based on the object data. Further, when the ECU 90 detects an object in front of the own vehicle 100, the ECU 90 acquires a moving direction and a moving speed of the object, based on the object data. Note that the objects detected by the ECU 90, based on the object data, are, for example, pedestrians and other vehicles.

The image sensor 52 is a sensor which captures images around the own vehicle 100 and acquires image data, and is, for example, a camera sensor. The image sensor 52 is electrically connected to the ECU 90. The ECU 90 acquires the image data from the image sensors 52 as the surrounding detection information IS.

The ECU 90 detects the objects in front of the own vehicle 100, based on the image data. In addition, when the ECU 90 detects the object in front of the own vehicle 100, the ECU 90 also acquires the moving direction and the moving speed of the object, based on the image data. Note that the objects detected by the ECU 90, based on the image data, is, for example, the pedestrians and other vehicles.

The inter-vehicle communication device 53 is a device which performs wireless communication or inter-vehicle communication with the ECUs of the other vehicles. The inter-vehicle communication device 53 is electrically connected to the ECU 90. The ECU 90 acquires the surrounding detection information including the object data and the image data transmitted by the ECUs of the other vehicles via the inter-vehicle communication device 53.

The ECU 90 detects the objects in the vicinity of the other vehicles, based on the surrounding detection information acquired by the inter-vehicle communication. Further, when the ECU 90 detects the object in the vicinity of the other vehicles, the ECU 90 acquires the moving direction and the moving speed of the object, based on the surrounding detection information acquired by the inter-vehicle communication. Note that the objects detected by the ECU 90, based on the image data, is, for example, the pedestrians and the other vehicles.

<Operation of Vehicle Control Apparatus>

Figure 2:
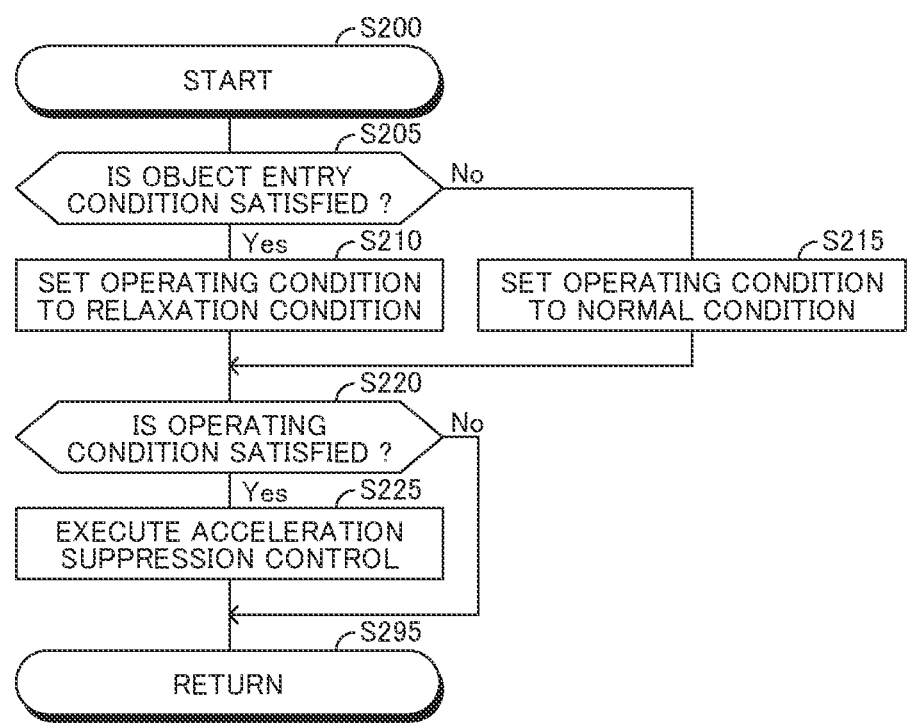
FIG. 2 is a flowchart of a routine executed by the vehicle control apparatus according to the embodiment of the present invention.

Next, operations of the vehicle control apparatus 10 will be described. The vehicle control apparatus 10 is configured to execute a routine shown in FIG. 2 with a predetermined calculation cycle. Therefore, at a predetermined timing, the vehicle control apparatus 10 starts a process from a step S200 of the routine shown in FIG. 2 and proceeds with the process to a step S205 to determine whether or not an object entry condition is satisfied.

Figure 3:
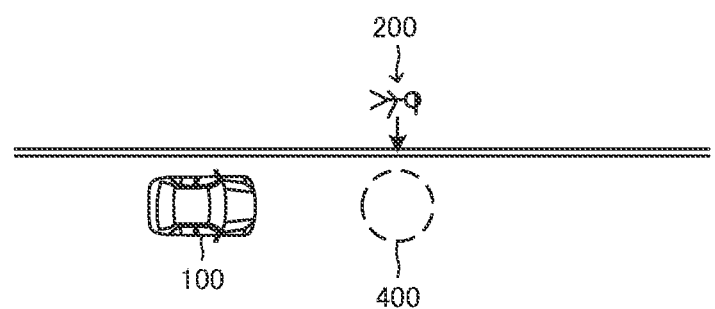
FIG. 3 is a view showing a scene in which a pedestrian is about to enter an area in front of an own vehicle.

The object entry condition is a condition that there is an object which has a probability to enter an area 400 in front of the own vehicle 100 from the side of the own vehicle 100. For example, as shown in FIG. 3, when the object 200 (in an example shown in FIG. 3, the pedestrian) is moving from the side of the own vehicle 100 toward the area 400 in front of the own vehicle 100, the vehicle control apparatus 10 determines that the object entry condition is satisfied. Note that the vehicle control apparatus 10 determines whether or not the object 200 has the probability to enter the area 400 in front of own vehicle 100, that is, whether or not the object entry condition is satisfied, based on the moving direction and the moving speed of the object 200.

When the vehicle control apparatus 10 determines "Yes" at the step S205, the vehicle control apparatus 10 proceeds with the process to a step S210 to set an operating condition to a relaxation condition and then, proceeds with the process to a step S220. On the other hand, when the vehicle control apparatus 10 determines "No" at the step S205, the vehicle control apparatus 10 proceeds with the process to a step S215 to set the operating condition to a normal condition and then proceeds with the process to the step S220.

The operating condition is a condition for executing the acceleration suppression control, and in the present example, the operating condition is a condition relating to the accelerator pedal operation amount AR The normal condition is a condition that the accelerator pedal operation amount AP is equal to or greater than a predetermined value or a normal operation amount threshold value AP_N. The relaxation condition is a condition that the accelerator pedal operation amount AP is equal to or greater than a predetermined value or a relaxation operation amount threshold value AP_R which is smaller than the normal operation amount threshold value AP_N.

The operating condition may include at least one of a condition regarding whether or not the object 200 is detected by the electromagnetic wave sensors 51 or the image sensors 52, and a condition regarding the own vehicle moving speed V.

In this case, for example, the normal condition is a condition that (i) the accelerator pedal operation amount AP is equal to or greater than the normal operation amount threshold value AP_N, (ii) the object 200 is detected by the electromagnetic wave sensors 51 or the image sensors 52, and (iii) the own vehicle moving speed V is equal to or smaller than a predetermined value or a normal speed threshold value V_N. Further, the relaxation condition is a condition that (i) the accelerator pedal operation amount AP is equal to or greater than the relaxation operation amount threshold value AP_R, and (ii) the own vehicle moving speed V is equal to or smaller than a predetermined value or a relaxation speed threshold value V_R.

In this case, the relaxation condition is satisfied when (i) the accelerator pedal operation amount AP is equal to or greater than the relaxation operation amount threshold value AP_R, and (ii) the own vehicle moving speed V is equal to or smaller than the relaxation speed threshold value V_R, regardless of whether the object 200 is detected by the electromagnetic wave sensors 51 or the image sensors 52. Further, the relaxation speed threshold value V_R may be set to the same value as the normal speed threshold value V_N, or may be set to a value smaller than the normal speed threshold value V_N.

Alternatively, for example, the normal condition is a condition that (i) the accelerator pedal operation amount AP is equal to or greater than the normal operation amount threshold value AP_N, (ii) the object 200 is detected by the electromagnetic wave sensors 51 or the image sensors 52, and (iii) the own vehicle moving speed V is equal to or smaller than the predetermined value or the normal speed threshold value V_N. Further, the relaxation condition is a condition that (i) the accelerator pedal operation amount AP is equal to or greater than the relaxation operation amount threshold value AP_R, (ii) the object 200 is detected by the electromagnetic wave sensors 51 or the image sensors 52, and (iii) the own vehicle moving speed V is equal to or smaller than the predetermined value or the relaxation speed threshold value V_R.

In addition, the operating condition may include a condition related to a predicted reaching time TTC in place of the condition related to the own vehicle moving speed V. The predicted reaching time TTC is a time required for the object 200 to reach the own vehicle 100 and is acquired, based on (i) a positional relationship between the object 200 and the own vehicle 100, (ii) the moving speed and the moving direction of the object 200, and (iii) the own vehicle moving speed V and the moving direction of the own vehicle 100.

In this case, for example, the normal condition is a condition that (i) the accelerator pedal operation amount AP is equal to or greater than the normal operation amount threshold value AP_N, (ii) the object 200 is detected by the electromagnetic wave sensors 51 or the image sensors 52, and (iii) the predicted reaching time TTC is equal to or smaller than a predetermined value or a normal time threshold value TTC_N. Further, the relaxation condition is a condition that (i) the accelerator pedal operation amount AP is equal to or greater than the relaxation operation amount threshold value AP_R, and (ii) the predicted reaching time TTC is equal to or smaller than a predetermined value or a relaxation time threshold value TTC_R.

When the vehicle control apparatus 10 proceeds with the process to the step S220, the vehicle control apparatus 10 determines whether or not the operating condition or a predetermined operating condition is satisfied. When the vehicle control apparatus 10 determines "Yes" at the step S220, the vehicle control apparatus 10 proceeds with the process to a step S225 to execute the acceleration suppression control.

In the present embodiment, the acceleration suppression control is a control to set the acceleration of the own vehicle 100 by the driving apparatus 20 to zero even when the accelerator pedal operation amount AP is great, and/or a control to brake and stop the own vehicle 100 by the braking apparatus 30.

On the other hand, when the vehicle control apparatus 10 determines "No" at the step S220, the vehicle control apparatus 10 proceeds with the process to a step S295 to terminate executing the process of this routine once. In this case, the acceleration suppression control is not executed.

Thereby, it is determined whether or not the acceleration suppression control needs to be executed, based on whether or not the object 200 has the probability to enter the area 400 in front of own vehicle 100. Therefore, the own vehicle 100 can be reliably prevented from colliding with the object 200 while an unnecessary execution of the acceleration suppression control is suppressed.

Figure 4:
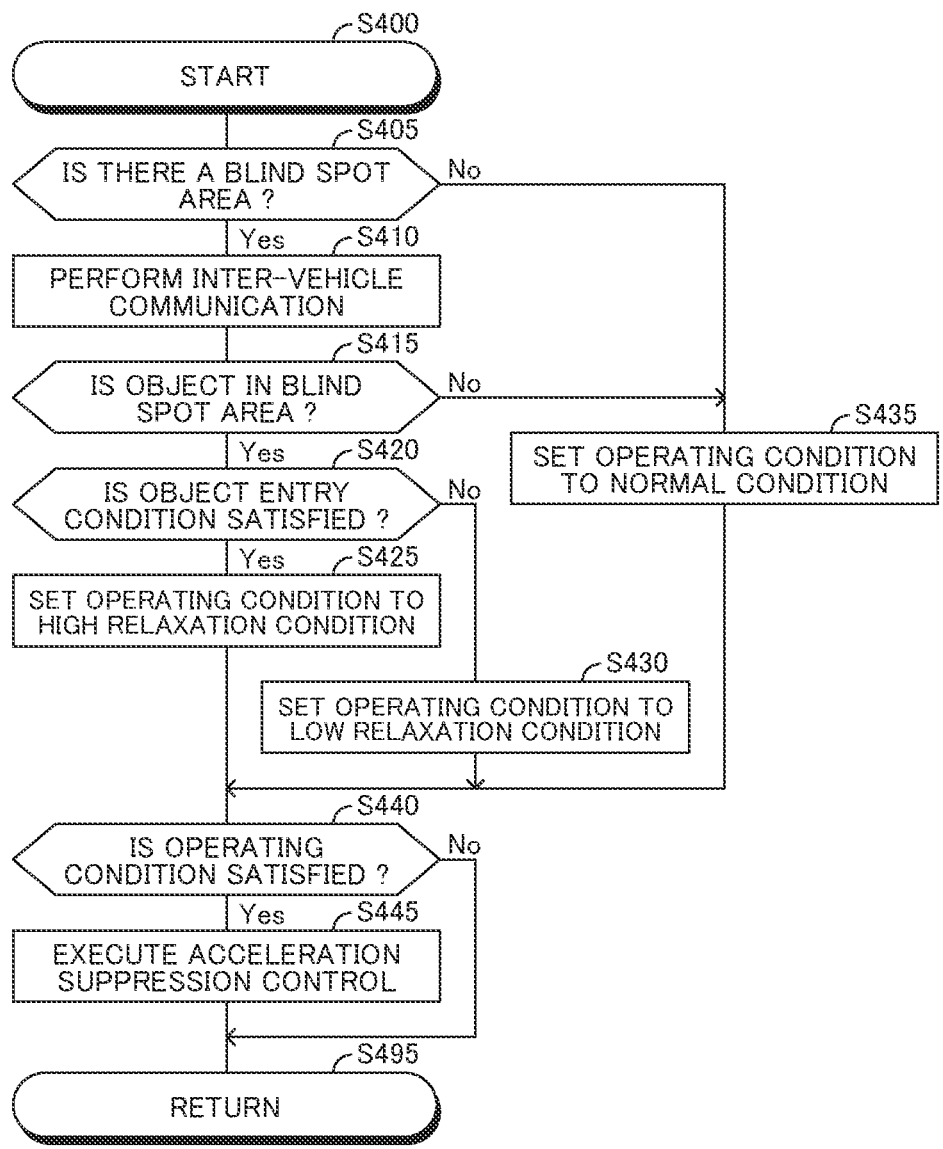
FIG. 4 is a flowchart of a routine executed by the vehicle control apparatus according to the embodiment of the present invention.

Alternatively, the vehicle control apparatus 10 may be configured to execute a routine shown in FIG. 4 with the predetermined calculation cycle. In this case, at a predetermined timing, the vehicle control apparatus 10 starts a process from a step S400 of the routine shown in FIG. 4 and proceeds with the process to a step S405 to determines whether or not a blind spot area 450 is detected.

Figure 5:
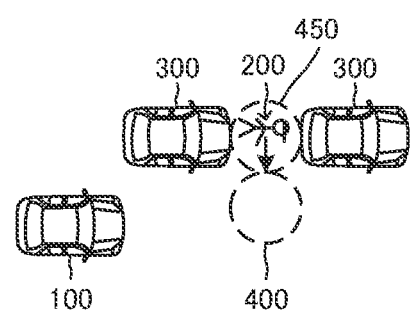
FIG. 5 is a view showing a scene in which the pedestrian is about to enter the area in front of the own vehicle from a blind spot area.

In the present embodiment, the blind spot area 450 is an area in which the vehicle control apparatus 10 cannot detect the object 200, based on the surrounding detection information IS, and is, for example, an area between two other vehicles 300 parked diagonally forward of the own vehicle 100 as shown in FIG. 5. The vehicle control apparatus 10 detects the blind spot area 450, based on the surrounding detection information IS.

When the vehicle control apparatus 10 determines "Yes" at the step S405, the vehicle control apparatus 10 proceeds with the process to a step S410 to acquire information on the blind spot area 450, based on the surrounding detection information acquired from the ECUs of the other vehicles 300 by performing the inter-vehicle communication. Note that in addition to acquiring the information on the blind spot area 450 by the inter-vehicle communication with the other vehicles 300, the vehicle control apparatus 10 may be configured to acquire information on the pedestrian or a user of a bicycle (for example, a position, a moving direction, and a moving speed of the pedestrian or the user of the bicycle) as the information on the blind spot area 450 by communication with a terminal such as a mobile phone which the pedestrian or the user of the bicycle in the blind spot area 450 has. The vehicle control apparatus 10 may be configured to acquire information on the object 200 in the blind spot area 450 (for example, a position, a moving direction, and a moving speed of the object 200) as the information on the blind spot area 450 by communication with an external device such as a monitoring camera installed in the vicinity of the blind spot area 450.

Next, the vehicle control apparatus 10 proceeds with the process to a step S415 to determine whether or not there is the object 200 in the blind spot area 450, based on the information on the blind spot area 450 acquired by the inter-vehicle communication.

When the vehicle control apparatus 10 determines "Yes" at the step S415, the vehicle control apparatus 10 proceeds with the process to a step S420 to acquire the moving direction and the moving speed of the object 200, based on the information on the blind spot area 450 acquired by the inter-vehicle communication, and determine whether or not the object entry condition is satisfied, based on the acquired information. The object entry condition here is a condition that the object 200 in the blind spot area 450 has the probability to enter the area 400 in front of own vehicle 100. For example, as shown in FIG. 5, when the object 200 is moving from the blind spot area 450 on the side of the own vehicle 100 toward the area 400 in front of the own vehicle 100, the vehicle control apparatus 10 determines that the object entry condition is satisfied.

When the vehicle control apparatus 10 determines "Yes" at the step S420, the vehicle control apparatus 10 proceeds with the process to a step S425 to set the operating condition to a high relaxation condition and proceeds with the process to a step S440.

On the other hand, when the vehicle control apparatus 10 determines "No" at the step S420, the vehicle control apparatus 10 proceeds with the process to a step S430 to set the operating condition to a low relaxation condition and proceeds with the process to the step S440.

Further, when the vehicle control apparatus 10 determines "No" at the step S405 or the step S415, the vehicle control apparatus 10 proceeds with the process to a step S435 to set the operating condition to the normal condition and proceeds with the process to the step S440.

In the routine shown in FIG. 4, the normal condition is a condition that the accelerator pedal operation amount AP is equal to or greater than the predetermined value or the normal operation amount threshold value AP_N. Further, the low relaxation condition is a condition that the accelerator pedal operation amount AP is equal to or greater than a predetermined value or a low relaxation operation amount threshold value AP_RL which is smaller than the normal operation amount threshold value AP_N. Furthermore, the high relaxation condition is a condition that the accelerator pedal operation amount AP is equal to or greater than a predetermined value or a high relaxation operation amount threshold value AP_RH which is smaller than the low relaxation operation amount threshold value AP_RL.

The operating condition may include at least one of a condition regarding whether or not the object 200 is detected by the electromagnetic wave sensors 51 or the image sensors 52, and a condition regarding the own vehicle moving speed V.

In this case, for example, the normal condition is a condition that (i) the accelerator pedal operation amount AP is equal to or greater than the normal operation amount threshold value AP_N, and (ii) the object 200 is detected by the electromagnetic wave sensors 51 or the image sensors 52. Further, the low relaxation condition is a condition that the accelerator pedal operation amount AP is equal to or greater than the low relaxation operation amount threshold value AP_RL. Furthermore, the high relaxation condition is a condition that the accelerator pedal operation amount AP is equal to or greater than the high relaxation operation amount threshold value AP_RH.

In this case, the low relaxation condition is satisfied when the accelerator pedal operation amount AP is equal to or greater than the low relaxation operation amount threshold value AP_RL regardless of whether the object 200 is detected by the electromagnetic wave sensors 51 or the image sensors 52. Also, the high relaxation condition is satisfied when the accelerator pedal operation amount AP is equal to or greater than the high relaxation operation amount threshold value AP_RH regardless of whether the object 200 is detected by the electromagnetic wave sensors 51 or the image sensors 52.

Alternatively, for example, the normal condition is a condition that (i) the accelerator pedal operation amount AP is equal to or greater than the normal operation amount threshold value AP_N, and (ii) the object 200 is detected by the electromagnetic wave sensors 51 or the image sensors 52. Further, the low relaxation condition is a condition that (i) the accelerator pedal operation amount AP is equal to or greater than the low relaxation operation amount threshold value AP_RL, and (ii) the object 200 is detected by the electromagnetic wave sensors 51 or the image sensors 52. Furthermore, the high relaxation condition is a condition that (i) the accelerator pedal operation amount AP is equal to or greater than the high relaxation operation amount threshold value AP_RH, and (ii) the object 200 is detected by the electromagnetic wave sensors 51 or the image sensors 52.

In addition, the operating condition may include a condition related to the predicted reaching time TTC in place of the condition related to the own vehicle moving speed V.

When the vehicle control apparatus 10 proceeds with the process to the step S440, the vehicle control apparatus 10 determines whether or not the operating condition is satisfied. When the vehicle control apparatus 10 determines "Yes" at the step S440, the vehicle control apparatus 10 proceeds with the process to a step S445 to execute the acceleration suppression control and proceeds with the process to a step S495 to terminate executing the process of this routine once.

On the other hand, when the vehicle control apparatus 10 determines "No" at the step S440, the vehicle control apparatus 10 proceeds with the process directly to the step S495 to terminate executing the process of this routine once.

Thereby, whether or not the acceleration suppression control needs to be executed, is determined, based on whether or not the objects 200 including the object 200 in the blind spot area 450 have the probability to enter the area 400 in front of own vehicle 100. Therefore, the own vehicle can be reliably prevented from colliding with the object 200 while the unnecessary execution of the acceleration suppression control can be suppressed from being executed.

It should be noted that the invention is not limited to the aforementioned embodiments, and various modifications can be employed within the scope of the invention.

What is claimed is:

1. A vehicle control apparatus, comprising:
a surrounding information detection apparatus provided with an own vehicle, which acquires information on a situation around the own vehicle; and
an electronic control unit configured to:
execute an acceleration suppression control to suppress an acceleration of the own vehicle when an operating condition including a condition that an accelerator pedal operation amount is equal to or greater than a predetermined threshold value is satisfied,
wherein the electronic control unit is configured to set the predetermined threshold value, which is used for determining whether to execute the acceleration suppression control, to a smaller value when an object entry condition that an object has a possibility to enter an area in front of the own vehicle, is satisfied than when the object entry condition is not satisfied,
wherein the object entry condition is a condition that (i) a blind spot area exists in front of the own vehicle, (ii) the object exists in the blind spot area, and (iii) the object has the possibility to enter the area in front of the own vehicle,
wherein the blind spot area is an area which the surrounding information detection apparatus of the own vehicle cannot detect, and the electronic control unit is configured to acquire information on the object that exists in the blind spot area by communication with at least one external device separate from the own vehicle.

2. The vehicle control apparatus according to claim 1, wherein the at least one external device is a device of another vehicle that has caused the blind spot area of the own vehicle, and the own vehicle includes an inter-vehicle communication device that communicates with the device of the another vehicle to acquire the information on the object.

3. The vehicle control apparatus according to claim 1, wherein the at least one external device is a mobile phone carried by a pedestrian in the blind spot area, and the electronic control unit communicates with the mobile phone to acquire the information on the object.

4. The vehicle control apparatus according to claim 1, wherein the at least one external device is a monitoring camera installed around the blind spot area, and the electronic control unit is configured to communicate with the monitoring camera to acquire the information on the object.

5. A vehicle control apparatus for acceleration suppression control, comprising:
an image sensor that captures images around an own vehicle and acquires image data; and
one or more processors programmed to:
acquire the images and image data from the image sensor;
determine whether an object entry condition is satisfied based on the acquired images and image data, wherein the object entry condition indicates that an object has a possibility to enter an area in front of the own vehicle;
set a predetermined threshold value to a smaller value when the object entry condition is satisfied than when the object entry condition is not satisfied;
determine whether an operating condition is satisfied, wherein the operating condition includes a condition that an accelerator pedal operation amount is equal to or greater than the predetermined threshold value,
wherein the object entry condition is a condition that (i) a blind spot area exists in front of the own vehicle, (ii) the object exists in the blind spot area, and (iii) the object has the possibility to enter the area in front of the own vehicle,
wherein the blind spot area is an area which the image sensor of the own vehicle cannot detect, and the electronic control unit is configured to acquire information on the object that exists in the blind spot area by communication with at least one external device separate from the own vehicle; and
based upon the operating condition being satisfied, suppress an acceleration of the own vehicle.

6. The vehicle control apparatus according to claim 5, wherein the at least one external device is a device of another vehicle that has caused the blind spot area of the own vehicle, and the own vehicle includes an inter-vehicle communication device that communicates with the device of the another vehicle to acquire the information on the object.

7. The vehicle control apparatus according to claim 5, wherein the at least one external device is a mobile phone carried by a pedestrian in the blind spot area, and the electronic control unit communicates with the mobile phone to acquire the information on the object.

8. The vehicle control apparatus according to claim 5, wherein the at least one external device is a monitoring camera installed around the blind spot area, and the electronic control unit is configured to communicate with the monitoring camera to acquire the information on the object.

* * * * *